United States Patent [19]
Fitzgerald et al.

[11] 3,823,963
[45] July 16, 1974

[54] INFORMATION SEGREGATION APPARATUS

[75] Inventors: Thomas Fitzgerald; Rebecca M. Edwards, both of Takoma Park, Md.

[73] Assignee: The Singer Company, New York, N.Y.

[22] Filed: Dec. 17, 1969

[21] Appl. No.: 885,943

[52] U.S. Cl............ 283/66, 116/114, 312/190
[51] Int. Cl............................................ B42d 15/00
[58] Field of Search.......................... 312/190–192, 312/50, 60, 61; 35/48 A; 283/45, 66, 63

[56] References Cited
UNITED STATES PATENTS

| | | | |
|---|---|---|---|
| 1,089,484 | 3/1914 | Leahy | 312/190 |
| 2,360,328 | 10/1944 | Bell | 283/45 |
| 2,497,200 | 2/1950 | Appel | 35/48 A |
| 2,609,219 | 2/1952 | Marano | 312/50 |
| 2,707,115 | 4/1955 | Rolleston | 312/50 |

*Primary Examiner*—Lawrence Charles
*Attorney, Agent, or Firm*—William Grobman; James C. Kesterson

[57] ABSTRACT

This invention comprises a simple device which serves as an overlay for reports or other document sources of information having prescribed formats. In abstracting information from such documents, the person performing the task must learn and then remember the order in which the information is to be used and where, in any particular format, the information is located. The overlay of this invention is a transparent sheet having areas thereon outlined to form boxes or bounded portions. When the sheet is placed over the document for which it was designed, the information which appears under each of the boxes is identified by appropriate instructions printed in the boxes so that an unskilled individual can properly abstract the desired information. Also included is a special container which permits the loading of a plurality of similar documents for use with a single overlay sheet, and the utilization of one document after another, without disturbing the overlay sheet.

3 Claims, 3 Drawing Figures

INVENTOR.
THOMAS FITZGERALD
REBECCA M. EDWARDS
BY
William Grobman

INVENTOR.
THOMAS FITZGERALD
REBECCA M. EDWARDS
BY
William Grobman

INFORMATION SEGREGATION APPARATUS

This invention relates to apparatus for information retrieval, and more particularly, to systems where information is present in one form and it is desirable to abstract that information and place it in another form.

Information surveys seem to be a national pastime of the people in the United States, and many new and improved techniques of sampling and of collecting information have been developed. But the utilization of the collected information still has many pitfalls and problems. For example, selecting the same information from a plurality of similar survey report forms and placing that information in the same order so that it can be studied on a common base requires the education of persons who are generally unskilled. With the increased popularity of electronic data processing equipment, standardization of formats for studying acquired information becomes even more important. It is necessary, for example, for the automatic study of gathered information that the same information from each of the reports be presented and that it be presented in the same manner in each case. It becomes important that the person selecting the information for machine format from the report documents understand the format and the report document. This requires training which is expensive. It also results, too often, in many errors. This invention aids in overcoming these problems, particularly for stock forms not designed for key punching.

It is an object of this invention to provide a new and improved means for aiding in the conversion of information from one form to another.

It is another object of this invention to provide a new and improved means for aiding the conversion of information from one form to another by unskilled persons.

It is a further object of this invention to provide means for enabling relatively unskilled persons to select information from a mass of information and place that information in a prescribed order.

It is still another object of this invention to provide new and improved means which is simple and inexpensive for enabling relatively unskilled individuals to select information in one format and place that information in another format easily, rapidly, and with few errors.

Other objects and advantages of this invention will become more apparent as the following description proceeds, which description should be considered together with the accompanying drawings in which.

Figure 1:
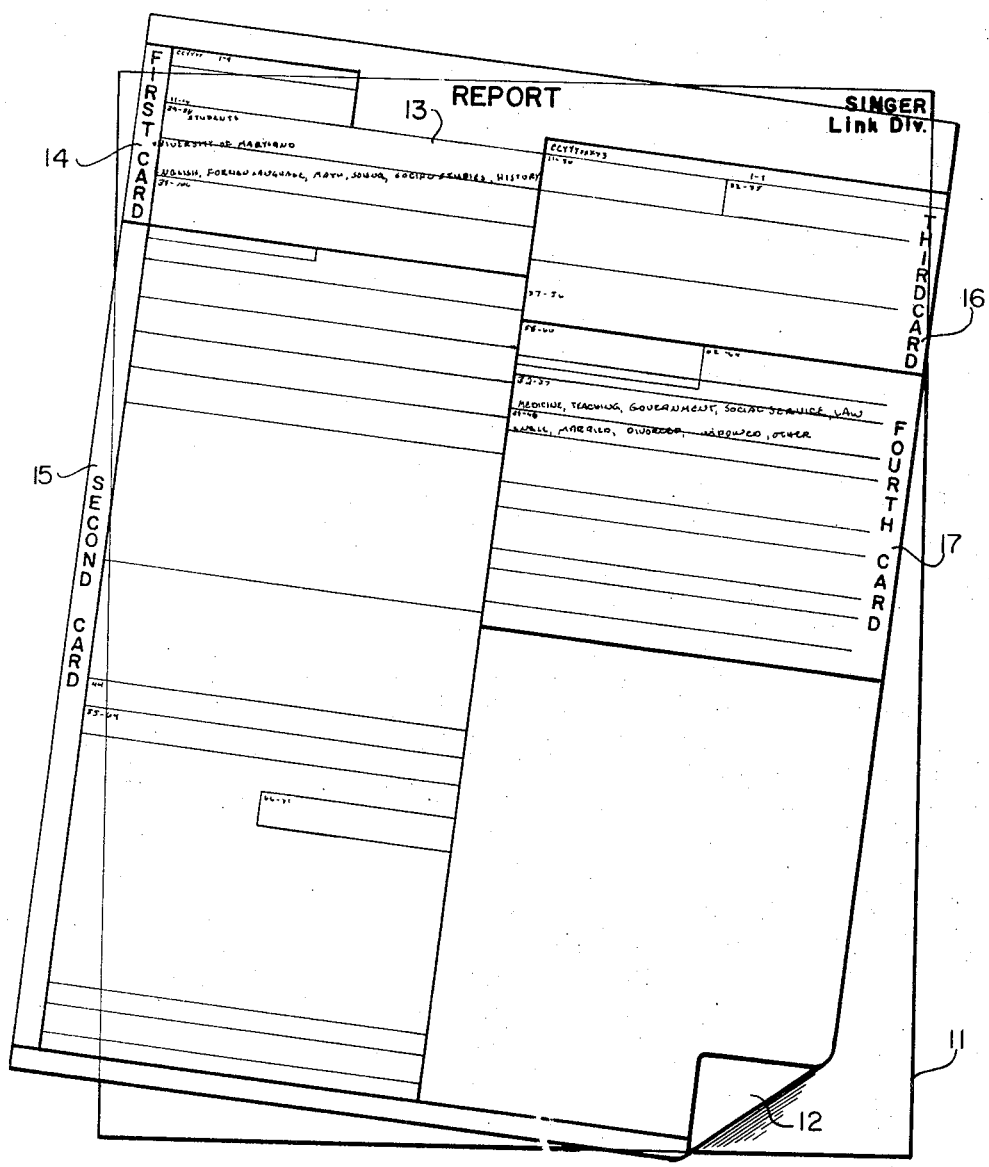
FIG. 1 is a plan view of a report document and the overlay of this invention.

Referring now to the drawings in detail, and more particularly to FIG. 1, the reference character 11 designates a document having a particular format for information contained thereon. Such documents may be information survey reports forms, examinations, health or sociological questionnaires, and the like. In most documents of this type, the format might well be standardized by printing prescribed locations for prescribed information. A cover sheet 12, which is transparent, has printed on its surface outlines of areas 13 with appropriate identifying legends therein. The sheet 12 shown in FIG. 1 is one which can be used, by way of example, to enable a card punch operator to enter information in desired locations on punched cards. In this case, the overlay sheet 12 is imprinted with a plurality of areas outlined in heavy lines. These areas are identified as FIRST CARD 14, SECOND CARD 15, THIRD CARD 16, and FOURTH CARD 17. Within each of the individual card areas 14-17 other, lighter weight lines are used further dividing each card area. These subdivisions of the individual card areas may be marked with the punch card positions in which the information is to be punched, which markings do not appear on the document 11.

Thus, considering the operation of the device shown in FIG. 1, assume that the document 11 is a questionnaire relating to individual persons and contains such information as the age of the subject, his educational background, his geographical location, his religious affiliation, his medical history, etc. The information contained on that part of the document which lies under the FIRST CARD portion 14 of the overlay sheet (and it should be mentioned that the overlay sheet is purposely shown on an angle to the document 11 so that the two are more readily seen as separate sheets but that in use the document 11 and the overlay sheet 12 will be aligned with each other) could contain information relating to the subject's work, including the organization where he is employed and its address. This information may be sufficient to fill one card. The information contained on the document 11 immediately below that covered by the FIRST CARD portion 14 is identified as SECOND CARD portion 15 and can contain information about the subject's religious affiliations, for example. In any case, the information on the document 11 which appears under that portion 15 is readily seen by the punch card operator to go on the second card. These individual boxes can identify even the card positions which are to contain the particular information. Thus, the punch card operator need not learn what information is present, or have to know how the information is to be used. The overlay sheet permits the operator to follow the guide lines on the overlay and punch the information contained on the document beneath onto the proper card and in the correct locations on the card. Of course, the outline on the overlay sheet 12 must be designed to correspond to the particular format of the document with which it is used. For this reason, some unique identifying legend should be placed on both sheets 11 and 12.

Figure 2:
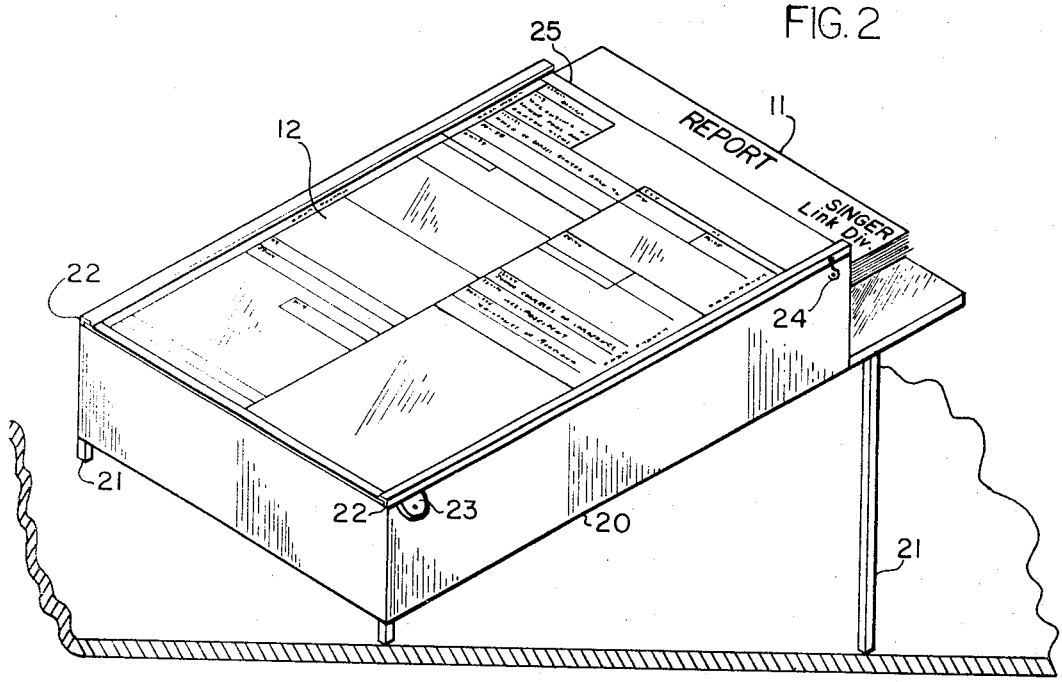
FIG. 2 is a perspective view of apparatus utilizing the report and overlay forms of this invention.
Figure 3:
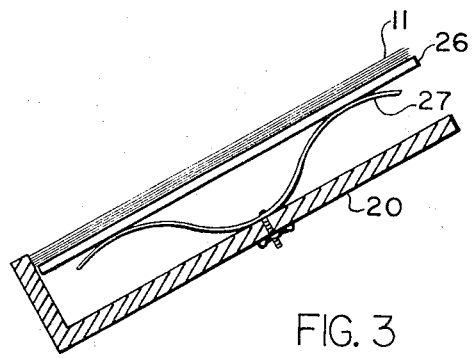
FIG. 3 is a side view in section of a portion of the apparatus of FIG. 2.

Even with the advantages inherent in the use of the overlay 12 described above, the handling of the individual documents 11 with a single overlay takes time and slows what could be a faster procedure. To overcome this disadvantage and to render the entire operation more efficient, the apparatus illustrated in FIGS. 2 and 3 is also provided. A stack of documents 11 are shown contained in a housing 20 which is mounted on legs 21. The rear legs 21 are longer than the front legs 21 to slope the housing 20. A cover 25 is mounted on hinges 23 at one end and has hook latches 24 at its other end. The cover 25 also has an angle member 22 attached to each of its long sides so that an overlay sheet 12 may be supported on the cover 25 under the angle members 22. As shown in FIG. 3, the bottom of the housing 20 has at least one bow or leaf spring 27 attached to it by any suitable means such as by the screw and nut shown. A stiff board member 26 is resiliently supported by the springs 27 and carries the stack of documents 11.

As mentioned above, one of the remaining problems which slows down the abstracting of information from the documents 11 and recording that information in another form such as punch cards is the need to handle each document 11 separately and to align it by itself, with the overlay sheet 12. This is overcome in the apparatus shown in FIGS. 2 and 3. The hook latches 24 are released, the cover 25 is swung back on the hinges 23, and a stack of the documents 11 are placed on top of the board member 26. When the cover 25, which is of suitable transparent material such as glass or an acrylic resin, is closed on its hinges 23, the stack of documents 11 and the board member 26 are pushed downward against the action of the springs 27. Preferably, there are at least two such springs 27, one on each side of the board member 26. The overlay sheet 12 is then inserted under the angle members 22 and on top of the transparent cover 25. The overlay sheet 12 readily can be moved slightly to ensure alignment with the documents 11. As the information from one document 11 is abstracted by the operator, that sheet is removed by sliding it upward, and the next document below it is now viewed through the overlay sheet 12 and the cover 25. Should the next document 11 be slightly out of alignment with the overlay sheet 12, either can be moved slightly to correct this. To render it easy to remove the documents 11 as they are completed, the cover 25 is cut out at the top for a finger grip or the cover 25 may be made shorter than the documents 11 as shown. As the documents 11 are removed from the housing 20, the remaining documents 11 are urged firmly upwardly against the cover 25 by the action of the springs 27. This tends to hold lower documents 11 in place and still permit the ready removal of the top such document. The entire housing 20 is sloped at a convenient angle to the person abstracting the information so that the entire procedure can be accomplished in the shortest time interval.

The above specification has described a new and improved apparatus for simplified abstraction of information from one format for conversion into another format. It is realized that the above description may indicate to those skilled in the art other ways in which the principles of this invention may be used without departing from its spirit. It is, therefore, intended that this invention be limited only by the scope of the appended claims.

What is claimed is:

1. Apparatus for aiding in the conversion of data from a format in which it is stored to a different format in which it is to be used, said apparatus comprising a plurality of groups of documents which carry visually observable information recorded in each group in a format which is characteristic of that group, a housing into which a plurality of documents of any group may be inserted as a stack and removed both as a stack and individually, said housing including a central chamber into which said documents are inserted, a top shelf for said chamber to retain said documents therein, said shelf being at least partially transparent so that the information carried by the top document of the stack in said chamber is visible therethrough, means in said housing for maintaining the top document of the stack in said chamber against the underside of said shelf, and a separate transparent cover sheet for each group of documents, each of said cover sheets having areas demarked to correspond to the information in the format characteristic of the particular group with which it is associated, said shelf being adapted to removably support said cover sheets in aligned relation to the top document of the stack in said chamber so that information in the particular format of each group is translated through the cover sheet associated therewith into a different format for use.

2. The apparatus defined in claim 1 further including means for supporting said housing so that said shelf is inclined to the horizon.

3. The apparatus defined in claim 2 wherein said housing is formed with its highest end at least partially removed to provide for individual access to the documents contained in said chamber.

* * * * *